(12) United States Patent
Harms

(10) Patent No.: US 9,446,846 B1
(45) Date of Patent: Sep. 20, 2016

(54) MULTI DIRECTIONAL INPUT CARGO MOVING SYSTEM

(71) Applicant: GOODRICH CORPORATION, Charlotte, NC (US)

(72) Inventor: Scott Harms, Ypsilanti, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/674,235

(22) Filed: Mar. 31, 2015

(51) Int. Cl.
*G06F 7/00* (2006.01)
*B64D 9/00* (2006.01)

(52) U.S. Cl.
CPC ........... *B64D 9/00* (2013.01); *B64D 2009/006* (2013.01)

(58) Field of Classification Search
CPC ....................................................... B64D 9/00
See application file for complete search history.

(56) References Cited

U.S. PATENT DOCUMENTS

| | | | | | |
|---|---|---|---|---|---|
| 4,006,869 | A | * | 2/1977 | Vogele ...................... | B64D 9/00 198/436 |
| 4,111,145 | A | * | 9/1978 | Ohsaka ................... | B63B 27/02 114/72 |
| 5,267,709 | A | * | 12/1993 | Koharcheck .............. | B64C 1/22 198/573 |
| 5,716,028 | A | * | 2/1998 | Evans ...................... | B64D 9/00 244/137.1 |
| 2007/0185598 | A1 | * | 8/2007 | Ortega ................... | G06Q 10/02 700/90 |
| 2009/0092471 | A1 | * | 4/2009 | Krantz ...................... | B64C 1/20 414/373 |
| 2009/0105874 | A1 | * | 4/2009 | Tietjen ..................... | B64D 9/00 700/217 |
| 2009/0121085 | A1 | * | 5/2009 | Hettwer ................... | B64D 9/00 244/137.1 |
| 2011/0273313 | A1 | * | 11/2011 | Hettwer ................... | B64D 9/00 340/945 |
| 2011/0313564 | A1 | * | 12/2011 | Schnorwangen ........ | B64D 9/00 700/214 |
| 2013/0240673 | A1 | * | 9/2013 | Schlosser ............... | G05D 1/101 244/137.1 |
| 2013/0297065 | A1 | * | 11/2013 | Huber ...................... | B64C 1/22 700/230 |
| 2014/0174071 | A1 | * | 6/2014 | Lee ......................... | E02F 9/2228 60/459 |
| 2014/0255137 | A1 | * | 9/2014 | Haertel .................... | B60P 1/52 414/529 |

OTHER PUBLICATIONS

Definition "modulus", Dictionary.com, unknown published date, all pages, retrieved on May 23, 2016 from http://www.dictionary.com/browse/modulus.*

* cited by examiner

*Primary Examiner* — Calvin Cheung
(74) *Attorney, Agent, or Firm* — Snell & Wilmer L.L.P.

(57) ABSTRACT

A cargo loading system may comprise a non-transitory memory communicating with a processor, the non-transitory memory having instructions stored thereon that, in response to execution by the processor, cause the processor to perform operations. The operations may comprise partitioning a cargo hold into a forward partition and an aft partition, reading a first input from a first joystick and a second input from a second joystick, mapping the first input to a first power drive unit (PDU) in the forward partition, and mapping the second input to a second PDU in the aft partition.

12 Claims, 4 Drawing Sheets

MULTI DIRECTIONAL INPUT CARGO MOVING SYSTEM

FIELD OF INVENTION

The present disclosure relates to aircraft cargo systems, and, more specifically, to a cargo loading system using multiple inputs to manipulate cargo.

BACKGROUND

Powered cargo systems may be used in loading and unloading cargo in aircraft cargo holds. The cargo handling area on a wide-bodied freighter aircraft may be 16 feet wide longitudinally (i.e., in a direction from wing to wing) with a doorway width of approximately 10 feet. Typical cargo containers or pallets may be 20 feet long. Difficulties may arise when loading a 20-foot-long container into a 16-foot-wide aircraft through a 10-foot door. Further difficulties may arise when airline operators load non-standard freight, which may not conform to standard pallet dimensions. Operators seeking to manually load cargo have typically been faced with a single joystick having 2-axis binary (i.e., on/off) controls.

SUMMARY

A cargo loading system may comprise a non-transitory memory communicating with a processor, the non-transitory memory having instructions stored thereon that, in response to execution by the processor, cause the processor to perform operations. The operations may comprise partitioning a cargo hold into a forward partition and an aft partition, reading a first input from a first joystick and a second input from a second joystick, mapping the first input to a first power drive unit (PDU) in the forward partition, and mapping the second input to a second PDU in the aft partition.

In various embodiments, the operations may further comprise determining a modulus of the first input and a direction of the first input. The cargo loading system may also map the modulus as a throttle of the first PDU, and map the direction of the first input into the direction of the first PDU. The first PDU and the second PDU may be configured to load a cargo into the cargo hold. The cargo loading system may select the first PDU in the forward partition in response to the cargo covering the first PDU. The operations may also include detecting the first PDU in the forward partition being covered by the cargo using an optical sensor, and partitioning the cargo hold into the forward partition forward of the centroid and the aft partition aft of the centroid.

A method of loading an aircraft may comprise partitioning a cargo hold into a forward partition and an aft partition, reading a first input from a first joystick and a second input from a second joystick, mapping the first input to a first power drive unit (PDU) in the forward partition, and mapping the second input to a second PDU in the aft partition.

In various embodiments, the method may include determining a modulus of the first input and a direction of the first input, mapping the modulus as a throttle of the first PDU, and mapping the direction of the first input into the direction of the first PDU. The first PDU and the second PDU may be configured to load a cargo into the cargo hold. The method may further comprise selecting the first PDU in the forward partition in response to the cargo covering the first PDU, detecting the first PDU in the forward partition being covered by the cargo using an optical sensor, estimating a centroid of the cargo, and partitioning the cargo hold into the forward partition forward of the centroid and the aft partition aft of the centroid.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft. As used herein, "forward" refers to the direction associated with the nose of an aircraft.

A cargo loading system may use operator input to manipulate large, heavy objects into a desired position in a cargo hold. The cargo may contact power drive units (PDU) located on the floor of the cargo hold to provide motive force for the cargo. An operator may control the PDUs using a two joystick input with non-binary joysticks. The joysticks may be non-binary in that the distance the joystick is displaced from a resting point may translate into a throttle control for the PDUs. Each joystick may control a different grouping of PDUs, as described in further detail below. The non-binary, dual joystick input system may provide increased granularity of movement.

Figure 1:
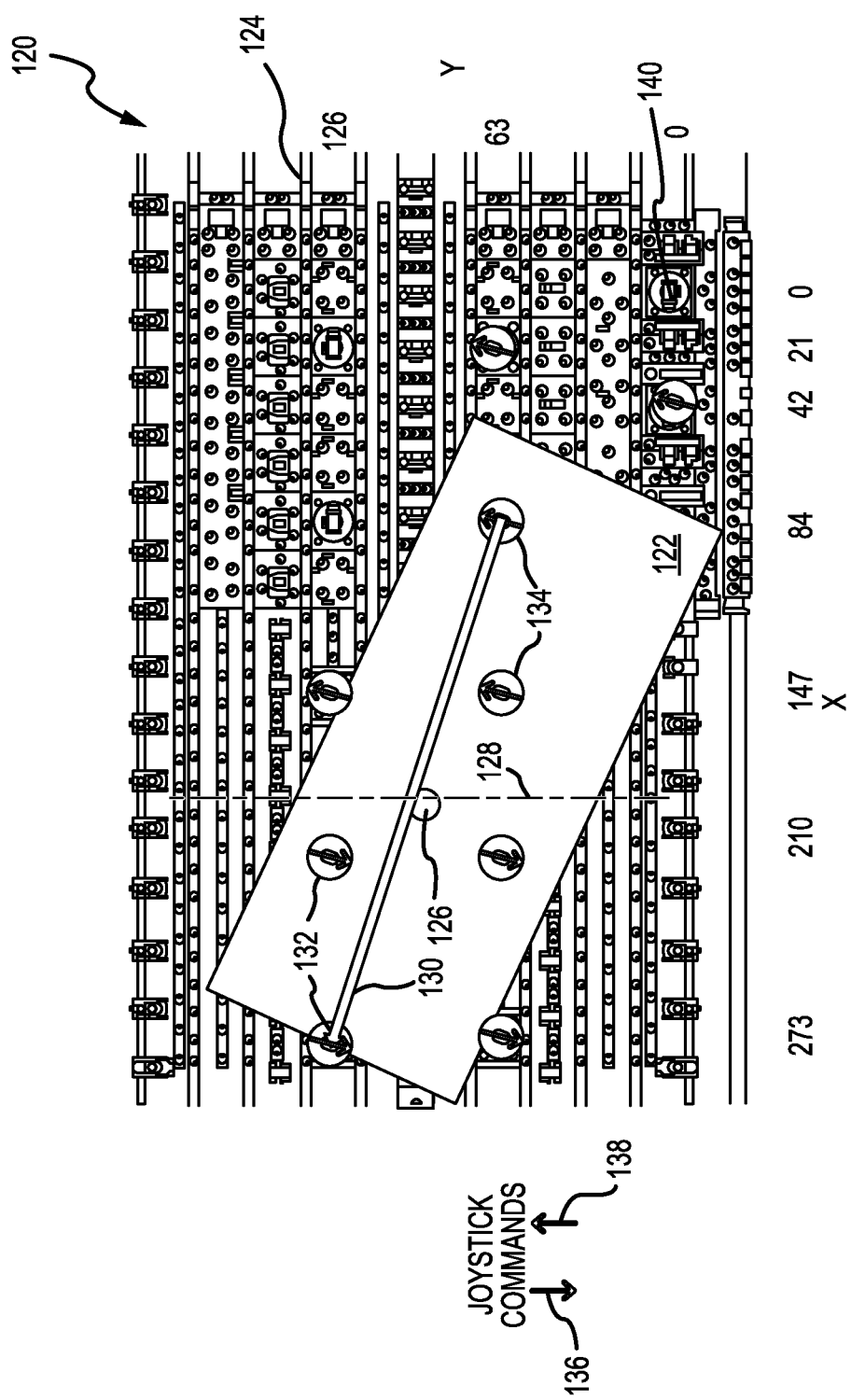
FIG. 1 illustrates a cargo loading system loading a container having a rectangular footprint with opposing joystick commands, in accordance with various embodiments.

With reference to FIG. 1, cargo loading system 120 is shown loading a container 122 having a rectangular footprint with opposing joystick commands, in accordance with various embodiments. Although a cargo container is illustrated, the loaded cargo could also be a pallet, an irregularly shaped object, an irregularly shaped container, or other cargo. The system estimates the centroid 126 of container 122 (or the portion of container 122 in cargo hold 124) using the positions of covered PDUs. Forward covered PDUs 132 and aft covered PDUs 134 may each have a corresponding position with the forward-aft position denoted by the x-axis (in inches) and the lateral position denoted by the y-axis (in inches). The centroid may be estimated by calculating the average x position of the forward covered PDUs 132 and the aft covered PDUs 134. Each PDU may include an optical sensor or other detection mechanism to determine when the PDU is covered.

For example, cargo loading system 120 detects that container 122 covers five PDUs in the depicted position based on detection by sensors integrated in the PDUs. The covered PDUs may include three forward covered PDUs 132 and two aft covered PDUs 134. The three forward covered PDUs 132 have x positions of 273, 210, and 210 and the two aft covered PDUs 134 have x positions of 84 and 147, as noted on the xy axes that are shown for illustrative purposes. The average x position of the five covered PDUs is 184.8. The y positions of the forward covered PDUs 132 are 126, 126, and 63 and the y positions of the aft covered PDUs 134 are 63 and 63 for an average y position of 88.2. Thus, the centroid is located at the x, y position of 184.8 and 88.2. PDUs 140 in cargo hold 124 are partitioned into two sets of PDUs 140 along the partition line 128, oriented laterally at x=184.8, with any PDU 140 forward of the line being part of the partition of forward PDUs and any PDU 140 aft of the line being part of the partition of aft PDUs. As container 122 moves, thereby covering and uncovering PDUs, centroid 126 may be re-estimated.

In various embodiments, cargo loading system 120 may calculate a reference vector 130. Reference vector 130 has a tail defined by the x,y position where the x coordinate is the aft position value (i.e., x coordinate) of the aft-most aft covered PDUs 134, and y coordinate is the average lateral value (i.e., y position) of the aft-most aft covered PDUs 134. The forward-most forward covered PDU 132 is located at (273, 126), which is thus the head of the reference vector. The aft-most aft covered PDU 134 is located at (84, 63), which is thus the tail of the reference vector. As container 122 moves, thereby covering and uncovering PDUs, reference vector 130 may be dynamically calculated.

In various embodiments, the left joystick 136 command is directed downward or towards the operator (i.e., the negative y direction) and the right joystick command is directed upward or away from the operator (i.e., the positive y direction). Thus, the downward direction is mapped to forward covered PDUs 132 and the upward direction is mapped to aft covered PDUs 134. The PDUs apply the mapped joystick commands relative to the reference vector by treating the reference vector as the x-axis of the joystick commands. That is, the joystick positions including displacement in the y direction map in a direction orthogonal to the reference vector. Similarly, joystick positions including displacement in the x direction may be mapped along the reference vectors. The modulus or magnitude of the joystick position (i.e., the distance the joystick is actuated by an operator) may be mapped to velocities or torque control loops of the PDUs. In that regard, the joysticks may act as a throttle as well as a directional control with greater displacement of the joystick commanding increased PDU speed.

Figure 2:
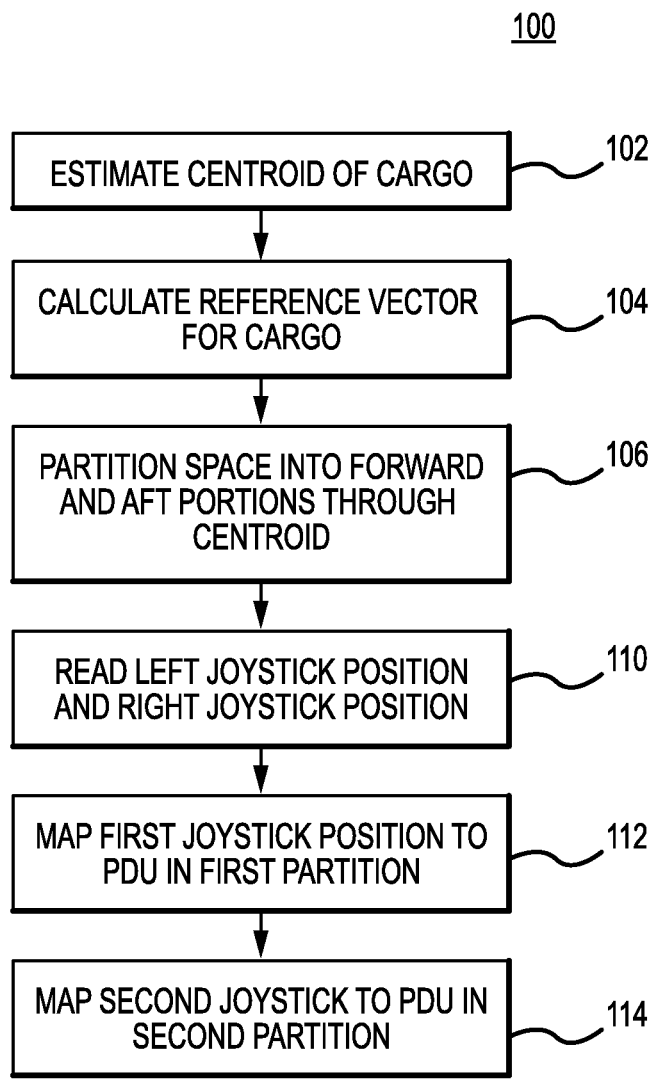
FIG. 2 illustrates a process for loading cargo using a cargo system with multiple joystick inputs, in accordance with various embodiments.

With reference to FIG. 2, a process 100 is shown for loading cargo in a cargo loading system 120 (of FIG. 1) with multiple joystick inputs. The process may be carried out by a processor and a tangible, non-transitory memory to command and interpret data from cargo loading system 120. The cargo system of FIG. 1 may include a tangible, non-transitory memory communicating with a processor, the non-transitory memory having instructions stored thereon that, in response to execution by the processor, cause the processor to perform the operations of process 100. Thus, cargo loading system 120 may be capable of carrying out the steps of FIG. 2.

Referring to FIG. 2, the processor estimates a centroid of the cargo to be loaded or unloaded (Step 102). The centroid of the cargo may represent an estimate of the center of the surface area of the bottom surface of the cargo. The centroid may be estimated using the positions of covered power drive units (PDU). A reference vector is also calculated for the cargo (Step 104). The reference vector may also be calculated using the positions of covered PDU.

In various embodiments, the space in the cargo hold may then be partitioned into forward and aft portions through the centroid (Step 106). The partition may split the PDU forward of the centroid into a first partition and the PDU aft of the centroid into a second partition. Next, the system may read the left joystick position and right joystick position (Step 110). A joystick position may include both a direction and a magnitude. The further a joystick is pressed in a direction, the greater the magnitude. In that regard, the joystick may start at a 0 position with the displacement from the starting 0 position being the magnitude. The system may map the first joystick position to a first of the PDU partitions (Step 112). For example, the left joystick maps to the PDU in the forward partition. The system may map the second joystick position to the PDU in the second partition (Step 114). Continuing the above example, the right joystick maps to the PDU in the aft partition. The cargo loading system 120 illustrated in FIGS. 2-4 may implement process 100 of FIG. 2.

Figure 3:
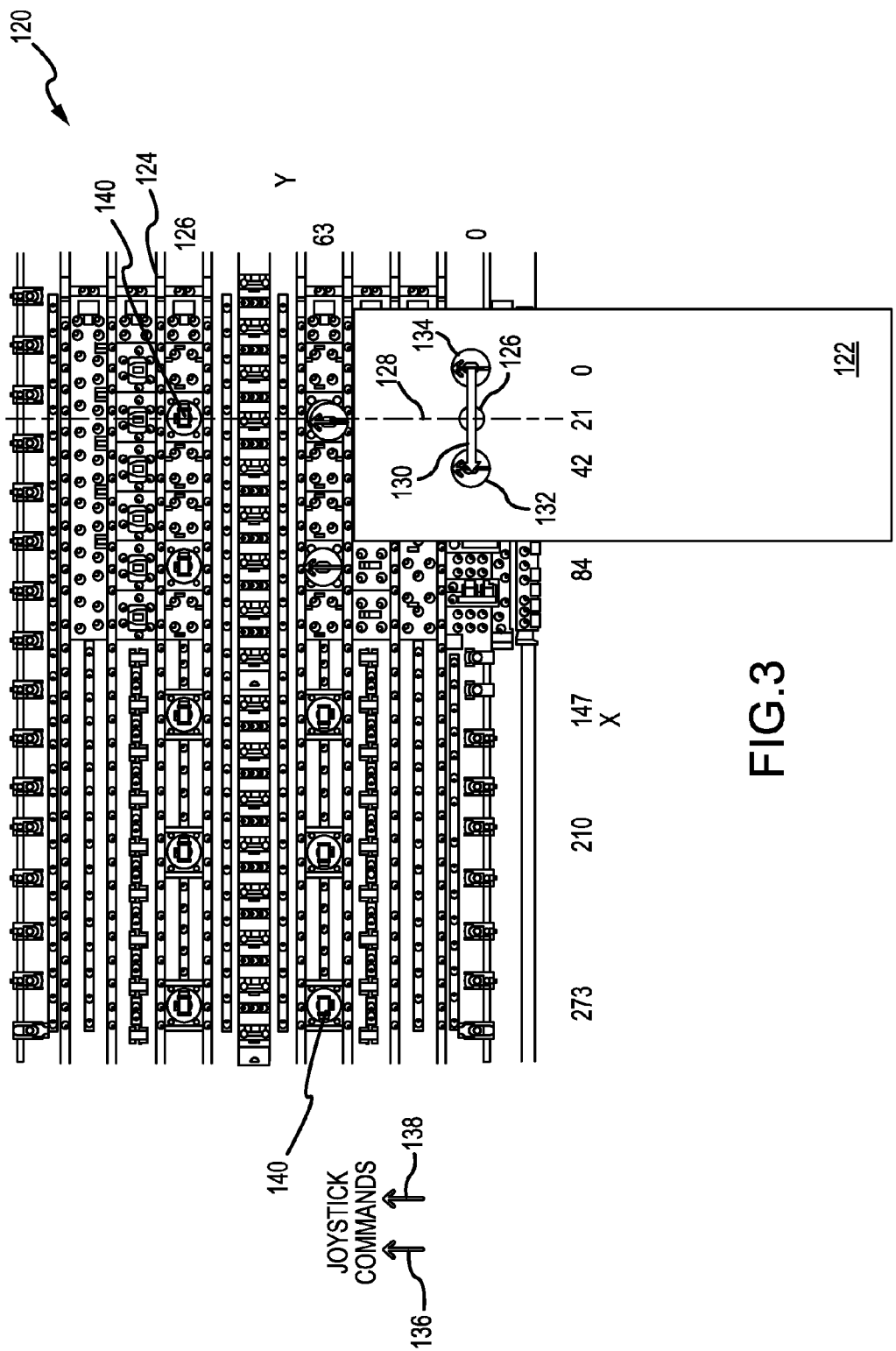
FIG. 3 illustrates a cargo loading system loading a container having a rectangular footprint and disposed partially in a cargo hold with identical joystick commands, in accordance with various embodiments.

With reference to FIG. 3, a cargo loading system 120 loading a container 122 having a rectangular footprint is shown partially loaded into cargo hold 124. Centroid 126 is estimated at the average position of forward covered PDU 132 (x,y coordinates of 42, 0.1) and aft covered PDU 134 (x, y coordinates of 0.1, 0.1). Thus, centroid 126 is estimated at the location with an x position of 21.05 and a y position 0.1. Partition line 128 passes laterally through centroid 126 to divide cargo hold 124 into forward and aft partitions. Reference vector 130 has a head at (x, y) position (42, 0.1) and a tail at (x, y) position (0.1, 0.1). In that regard, reference vector 130 may be parallel or in the direction of the x axis such that any mapped directions translate directly from the joysticks onto the PDUs in the same orientation.

In various embodiments, left joystick 136 and right joystick 138 may both be displaced a same distance in the positive y direction. The left joystick 136 input may be mapped to the forward covered PDU 132, and the right joystick 138 input may be mapped to the aft covered PDU. Since the left joystick 136 and right joystick 138 are both displaced the same distance in the same direction, the aft covered PDU 134 and forward covered PDU 132 are commanded to direct container 122 in the same direction at the same speed. PDUs 140 may remain off or be oriented and operate based on the location of PDUs 140 relative to the partition line 128.

Figure 4:
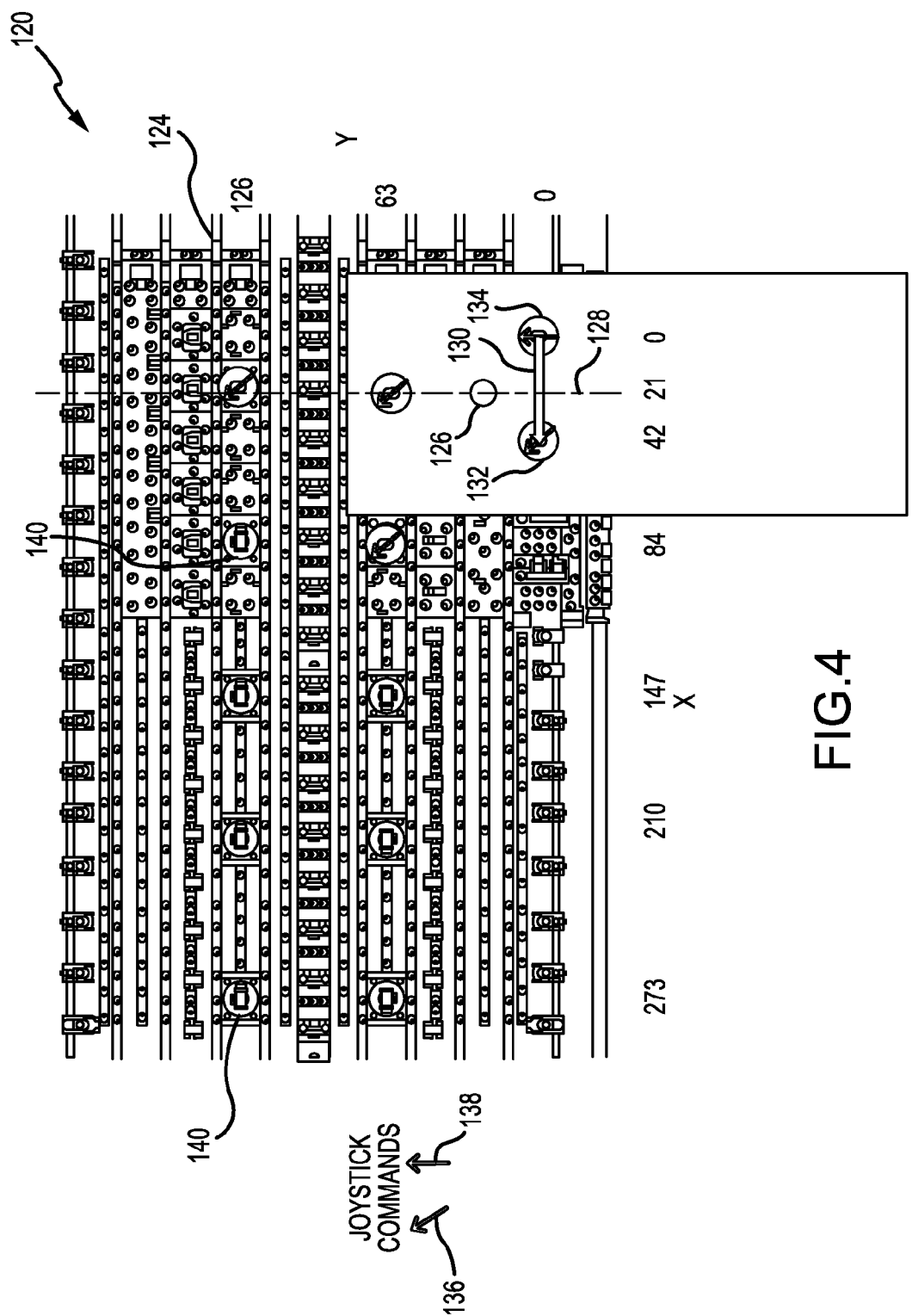
FIG. 4 illustrates a cargo loading system loading a container having a rectangular footprint and disposed partially in a cargo hold with identical joystick commands, in accordance with various embodiments.

With reference to FIG. 4, a cargo loading system 120 loading a container 122 having a rectangular footprint and disposed partially in a cargo hold is shown, in accordance with various embodiments. Centroid 126 is estimated at the average position of forward covered PDUs 132 (x positions of 42 and 21 and y positions of 0.1 and 63) and aft covered PDU 134 (x, y coordinates of 0.1, 0.1). Thus, centroid 126 is estimated at the location with an x position of 21.0 and a y position 21.1. Partition line 128 passes laterally through centroid 126 to divide cargo hold 124 into forward and aft partitions. Based on the position of the forward-most forward covered PDUs 132 and the aft-most aft covered PDUs 134, reference vector 130 has a head at (x, y) position (42, 0.1) and a tail at (x, y) position (0.1, 0.1). In that regard, reference vector 130 may be parallel or in the direction of the x axis such that any mapped directions translate directly from the joysticks onto the PDUs in the same orientation. That is, PDUs 140 forward of partition line 128 may operate as forward covered PDUs and PDUs 140 aft of partition line 128 may operate as aft covered PDUs 134. In that regard, PDUs 140 near container 122 may be in an activated state to receive container 122 as container 122 moves through cargo hold 124 and covers PDUs 140 that were previously uncovered.

In various embodiments, left joystick 136 may be displaced in a positive x direction and a positive y direction. Right joystick 138 may be displaced in the positive y direction. The left joystick 136 input may be mapped to the forward covered PDUs 132, and the right joystick 138 input may be mapped to the aft covered PDU 134. Thus, forward covered PDUs 132 may be oriented in a direction reflective of the left joystick 136 direction. Similarly, aft covered PDUs may be oriented in a direction reflective of the right joystick 138 direction. The modulus of the left joystick 136 displacement (i.e., the distance the joystick is displaced from the starting position) may be mapped to forward covered PDUs 132 as a velocity or torque. Similarly, the modulus of the right joystick 138 displacement may be mapped to aft covered PDUs 134 as a velocity or torque. PDUs 140 may remain off or be oriented and operate based on the location of PDUs 140 relative to the partition line 128. That is, PDUs 140 forward of partition line 128 may operate as forward covered PDUs and PDUs 140 aft of partition line 128 may operate as aft covered PDUs 134.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo loading system, comprising:
a non-transitory memory communicating with a processor, the non-transitory memory having instructions stored thereon that, in response to execution by the processor, cause the processor to perform operations comprising:
partitioning, by the processor, a cargo hold into a forward partition and an aft partition;
reading, by the processor, a first input from a first joystick and a second input from a second joystick;
determining, by the processor, a modulus of the first input and a direction of the first input;
controlling, by the processor, the first input to a first power drive unit (PDU) in the forward partition by,
applying, by the processor, the modulus as a throttle of the first PDU;
applying, by the processor, the direction of the first input into the direction of the first PDU; and
applying, by the processor, the second input to a second PDU in the aft partition.

2. The cargo loading system of claim 1, wherein the first PDU and the second PDU are configured to load a cargo into the cargo hold.

3. The cargo loading system of claim 2, further comprising selecting, by the processor, the first PDU in the forward partition in response to the cargo covering the first PDU.

4. The cargo loading system of claim 3, further comprising detecting, by the processor, the first PDU in the forward partition being covered by the cargo using an optical sensor.

5. The cargo loading system of claim 2, further comprising estimating, by the processor, a centroid of the cargo.

6. The cargo loading system of claim 5, wherein the partitioning the cargo hold into the forward partition and the aft partition further comprises partitioning the cargo hold into the forward partition forward of the centroid and the aft partition aft of the centroid.

7. A method of loading an aircraft, comprising:
estimating a centroid of a cargo;
partitioning a cargo hold into a forward partition forward of the centroid and an aft partition aft of the centroid;
reading a first input from a first joystick and a second input from a second joystick;
applying the first input to a first power drive unit (PDU) in the forward partition to control the first PDU; and
applying the second input to a second PDU in the aft partition to control the second PDU.

8. The method of claim 7, further comprising determining a modulus of the first input and a direction of the first input.

9. The method of claim 8, wherein the mapping the first input to the first PDU comprises:
mapping the modulus as a throttle of the first PDU; and
mapping the direction of the first input into the direction of the first PDU.

10. The method of claim 7, wherein the first PDU and the second PDU are configured to load a cargo into the cargo hold.

11. The method of claim 10, further comprising selecting the first PDU in the forward partition in response to the cargo covering the first PDU.

12. The method of claim 11, further comprising detecting the first PDU in the forward partition being covered by the cargo using an optical sensor.

* * * * *